(12) United States Patent
Proctor

(10) Patent No.: US 7,715,063 B2
(45) Date of Patent: *May 11, 2010

(54) CVT INTEGRATED ILLUMINATOR

(75) Inventor: Douglas E. Proctor, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1441 days.

This patent is subject to a terminal disclaimer.

(21) Appl. No.: 11/095,181

(22) Filed: Mar. 31, 2005

(65) Prior Publication Data

US 2006/0227388 A1 Oct. 12, 2006

(51) Int. Cl.
*H04N 1/04* (2006.01)

(52) U.S. Cl. .................. 358/474; 358/488; 358/475; 358/509; 358/484; 358/487; 250/208.1; 250/216; 362/307

(58) Field of Classification Search .................. 358/474, 358/488, 509, 475, 501, 505, 487, 484, 471; 362/307, 223, 346; 250/208.1, 216, 229, 250/506

See application file for complete search history.

(56) References Cited

U.S. PATENT DOCUMENTS

| | | | |
|---|---|---|---|
| 3,774,021 A | 11/1973 | Johnson | |
| 4,342,908 A | 8/1982 | Henningsen et al. | |
| 5,153,750 A | 10/1992 | Hiroi et al. | |
| 5,257,340 A | 10/1993 | Kaplan | |
| 5,453,849 A * | 9/1995 | Copenhaver et al. | 358/475 |
| 5,526,141 A | 6/1996 | Ogura et al. | |
| 5,804,818 A | 9/1998 | Kaplan | |
| 5,982,512 A | 11/1999 | Kim | |
| 5,986,253 A * | 11/1999 | Tabata | 250/208.1 |
| 6,002,494 A * | 12/1999 | Tabata | 358/475 |
| 6,015,200 A | 1/2000 | Ogura | |
| 6,017,130 A | 1/2000 | Saito et al. | |
| 6,046,826 A | 4/2000 | Lu et al. | |
| 6,139,174 A | 10/2000 | Butterworth | |
| 6,236,470 B1 * | 5/2001 | Seachman | 358/471 |
| 6,268,600 B1 | 7/2001 | Nakamura | |
| 6,299,328 B1 * | 10/2001 | Wilson | 362/223 |
| 6,346,997 B1 * | 2/2002 | Takeda et al. | 358/484 |

(Continued)

FOREIGN PATENT DOCUMENTS

JP 10-274746 10/1998

(Continued)

OTHER PUBLICATIONS

U.S. Appl. No. 10/955,462, filed Nov. 23, 2004.

(Continued)

*Primary Examiner*—Negussie Worku
(74) *Attorney, Agent, or Firm*—Pillsbury Winthrop Shaw Pittman LLP

(57) ABSTRACT

A light-transmissive constant velocity transport platen. A light source is an integral part of the light-transmissive platen forming a light guide illuminator. The constant velocity transport integrated illuminator uses total internal reflection within the light-transmissive platen as well as frustrated total internal reflection at extraction surfaces to direct light out from an aperture to a document translated by a constant velocity transport system. For point light source, the system uses a deflector to avoid hot spots in the illumination profile. The deflector is no longer needed when line source is used in the constant velocity transport integrated illuminator.

20 Claims, 6 Drawing Sheets

U.S. PATENT DOCUMENTS

| | | | |
|---|---|---|---|
| 6,417,508 | B1 | 7/2002 | Ogura et al. |
| 6,469,808 | B1 | 10/2002 | Onishi et al. |
| 6,476,369 | B1 | 11/2002 | Matsumoto |
| 6,563,609 | B1 | 5/2003 | Hattori |
| 6,593,995 | B1 * | 7/2003 | Hogestyn .................. 355/41 |
| 6,598,998 | B2 | 7/2003 | West et al. |
| 6,646,769 | B1 | 11/2003 | Fang |
| 6,660,987 | B2 * | 12/2003 | Koshimizu ............. 250/208.1 |
| 6,661,497 | B2 * | 12/2003 | Tabata et al. .............. 355/69 |
| 6,710,899 | B2 | 3/2004 | Chung et al. |
| 6,999,210 | B2 * | 2/2006 | Uchida .................... 358/475 |
| 7,224,494 | B2 * | 5/2007 | Saitou et al. ............. 358/474 |
| 7,589,870 | B2 * | 9/2009 | Pai ........................... 358/474 |
| 2002/0097578 | A1 | 7/2002 | Greiner |
| 2005/0093813 | A1 | 5/2005 | Yamamoto et al. |
| 2005/0122742 | A1 | 6/2005 | Ho |
| 2006/0159393 | A1 | 7/2006 | Ikeda |
| 2006/0227393 | A1 * | 10/2006 | Herloski .................. 358/509 |
| 2007/0002567 | A1 * | 1/2007 | Herloski et al. ........... 362/307 |

FOREIGN PATENT DOCUMENTS

| | | |
|---|---|---|
| WO | 9826212 A1 | 6/1998 |

OTHER PUBLICATIONS

Chinese Office Action issued in application No. 200610071001.0, dated Mar. 13, 2009, 11 pages (including an English translation thereof).

Chinese Office Action with English translation, dated Aug. 1, 2008, in corresponding foreign application 200510127000.9, 12 pp.

Office Action issued in related Chinese application on No. 200510127000.9, Feb. 6, 2009, 12 pages (including full English translation).

* cited by examiner

CVT INTEGRATED ILLUMINATOR

BACKGROUND

All references cited in this specification, and their references, are incorporated by reference herein where appropriate for teachings of additional or alternative details, features and/or technical background.

Disclosed is a constant velocity transport (CVT) platen having an integrated document illuminator for use in image scanners for recording images from sheets of material, such as paper.

Scanners use different types of light sources to illuminate documents placed on a transparent surface, called a platen. Quality of scanned images depends, among other factors, upon the quality of the luminescence from a document illuminator (comprising a light source) projected onto the document through the platen. Document illuminators are arranged about the platen in various ways, such as underneath the platen, and may include components ranging from one or more lamps, including tungsten and fluorescent lamps, and opposed reflectors. These arrangements may consume relatively large amounts of space in the scanner, and, in some cases, make it difficult to adjust the distance from the document illuminator to the underside of the platen thereby affecting the quality of the scanned image.

A document imaging system associated with a scanner is shown in FIG. 1. As described in U.S. Pat. No. 6,236,470, the system may be employed in either a light lens scanning system or a digital (image input terminal) scanning system in order to illuminate a document for reproduction, display, and/or storage in an electronic memory, magnetic medium, or optical disk. The illumination system of FIG. 1 includes a platen 20 upon which a document 10 is placed. The documents may be dispensed on the platen by a constant velocity transport document feeding roll 15. The glass platen 20 provides for the image positional alignment of the document being fed and scanned by an imager held stationary under the platen at that imaging position while the documents are fed over the top of the platen. As described in U.S. Pat. No. 6,593,995, which along with U.S. Pat. No. 6,236,470 is incorporated herein in its entirety by reference, some scanners have dual mode document imaging systems for either scanning a stationary document with a moving document imager on a large fixed platen or feeding documents past an imaging station on an adjacent smaller platen with the same document imager held stationary.

In FIG. 1, document 10 is illuminated by a light source 50 which provides an active source of light to irradiate the illuminated region of the document. Typically, this source of light is provided by a linear fluorescent lamp (with or without aperture reflecting coatings 60 on the interior lamp surface to form an aperture 65), or by linear tungsten lamps. The light source 50 is situated on one side of an optical center line 40. An imaging system 43, including a lens, causes an image of the portion of the document immediately surrounding this optical centerline 40 to be projected onto a light sensing device 45 comprising a linear array of photo-sensors (full width array sensor), a CCD sensor, or a photoreceptor (not shown). The light reflected from the document about the optical centerline 40 is converted by the light sensing device 45 into electronic signals forming image data which electronically represent the document, and the data may be stored on a recording device such as a memory storage device in a computer.

On the opposite side of the optical center line 40, an opposing reflector 30 is situated. The opposing reflector 30 provides indirect illumination to the document being scanned by redirecting light which would normally not illuminate the document (light leaving the light source in a parallel or substantially parallel path with respect to the platen 20) back to the illuminated region of the document. Reflector 30 reflects scattered light 57 back 35 to the document 10 at an angle opposite from the angle of light being directly 55 emitted by the light source 50. This reflection suppresses shadowing on documents with nonplanar features.

FIG. 2 illustrates an improved document illuminator with substantially smaller dimensions and compact size as set forth in application Ser. No. 10/995,462. The document illuminator system shown in FIG. 2 replaces the lamp/reflector system of FIG. 1. The document illuminator 100 of FIG. 2 comprises a light guide 105 embedded with a small size light source, such as a light emitting diode (LED). Light source region 110 emits light that is directed out of the light guide as rays 120 to illuminate the document 10 on platen 20, as shown in FIG. 2.

It will be appreciated by those skilled in the art that there are usually complications associated with the workings of document illuminators involving trade offs that must be made with regard to system conjugates and lens efficiency in order to accommodate space requirements of the illuminator. The variability of the proximity of the document illuminator on the underside of the platen, and of the thickness of the platen, all contribute to the complexity that can be alleviated by incorporating the light source into the platen itself, as disclosed further below.

SUMMARY

Aspects disclosed herein include a device comprising a document holder; the document holder further comprising a light-transmissive element; the light-transmissive element having a first edge and an opposing edge; the light-transmissive element further having a top surface and a bottom surface; a cavity formed in the light-transmissive element proximal to the first edge; a light source positioned in the cavity; an aperture formed on the top surface of the light-transmissive element proximal to the opposing edge; a light deflector disposed between the light source and the aperture; one or more extraction surfaces formed on the bottom surface opposing the aperture on the top surface of the light-transmissive element; and a surround encasing the light-transmissive element around the aperture; wherein light from the light source traverses the document holder to the aperture to illuminate a document transported to the document holder.

a device comprising a light-transmissive platen having an embedded light source, one or more extraction surfaces, an aperture and a surround; wherein light emitted from the light source is transmitted to the aperture to illuminate a document; a lens adapted to receive a reflected image of the document and to focus the reflected image on to an array of sensors to convert the images to electronic signals; and a memory storage device to record the electronic signals as digital data.

DETAILED DESCRIPTION

In embodiments there is illustrated a document holder integrated with a document illuminator.

In one embodiment, the disclosed document holder comprises a platen of a scanner operating in a constant velocity transport mode where the platen and the document illuminator remain stationary.

Figure 3:
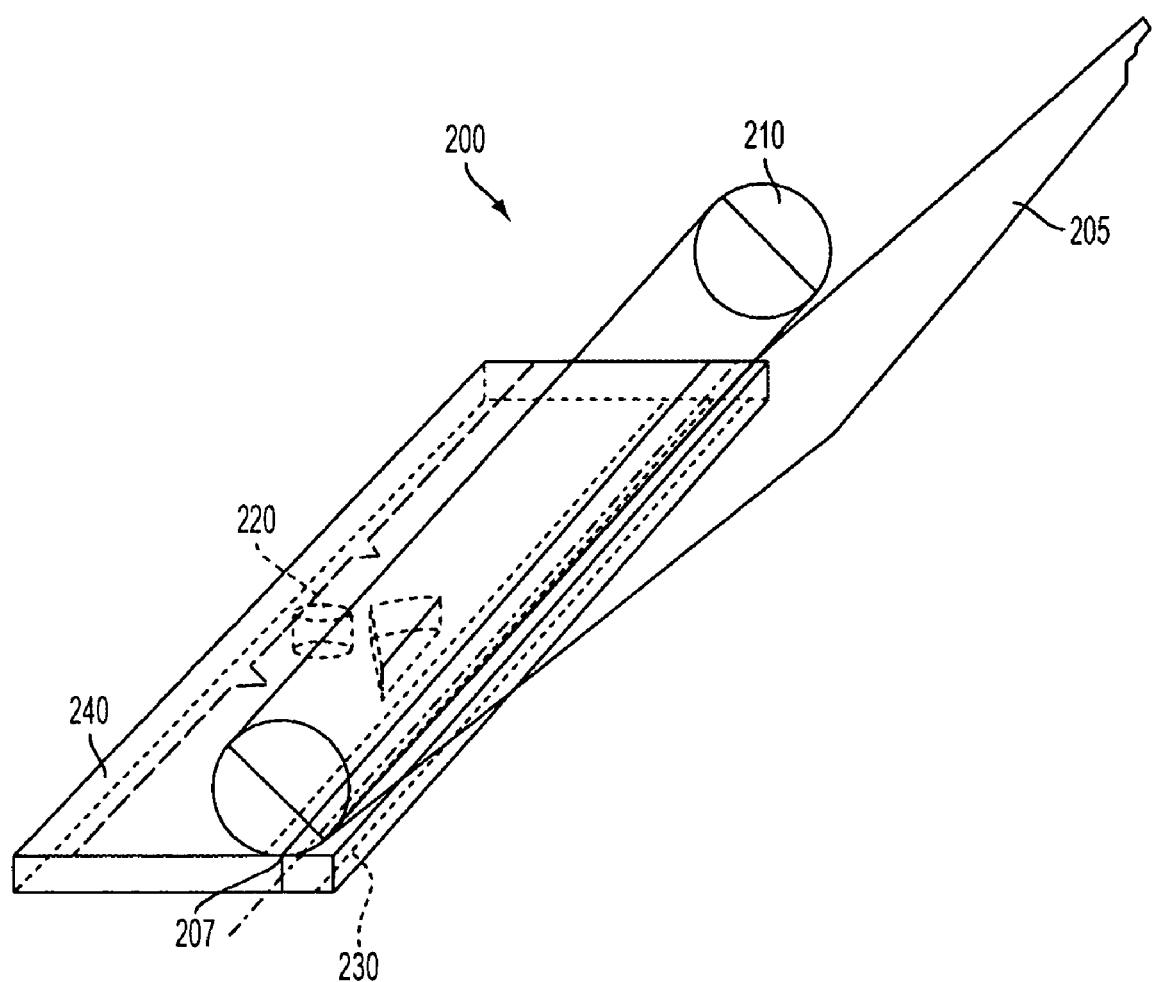
FIG. 3 is a drawing of a portion of a constant velocity transport system showing the disposition of a constant velocity transport roll positioned above the clear aperture of an embodiment of the constant velocity transport integrated illuminator.

The constant velocity transport integrated illuminator may enable scanning a moving document on a fixed platen past an imaging station. FIG. 3 shows a document handler system 200 comprising a constant velocity transport roller 210 positioned over a platen which is configured to accept light source 220 as an integral part of the platen. The constant velocity transport may comprise at least a roller 210 operationally configured with respect to platen 240 to move a document sheet 205 over an aperture 230 as shown in FIG. 3. Document sheets 205 may be automatically individually fed from a stack of sheets in an input tray (not shown) by a document feeder into sheet path 207 to the constant velocity transport imaging station positioned at 230 where the constant velocity transport roller engages and feeds the sheet 205 at a constant velocity while pressing the imaged area of the sheet 205 against the upper surface of the narrow transparent glass imaging platen 240 for imaging by an raster input scanner imaging optics (not shown) unit below aperture 230. The raster input scanner, which is described in the cited U.S. Pat. No. 6,593,995, is a part of a known type of imaging unit having slide pads providing a low friction surface to maintain engagement with the surface of platen 240 for maintaining a consistent focal distance from the upper surface of the platen, and hence from the document 205 being imaged.

Figure 1:
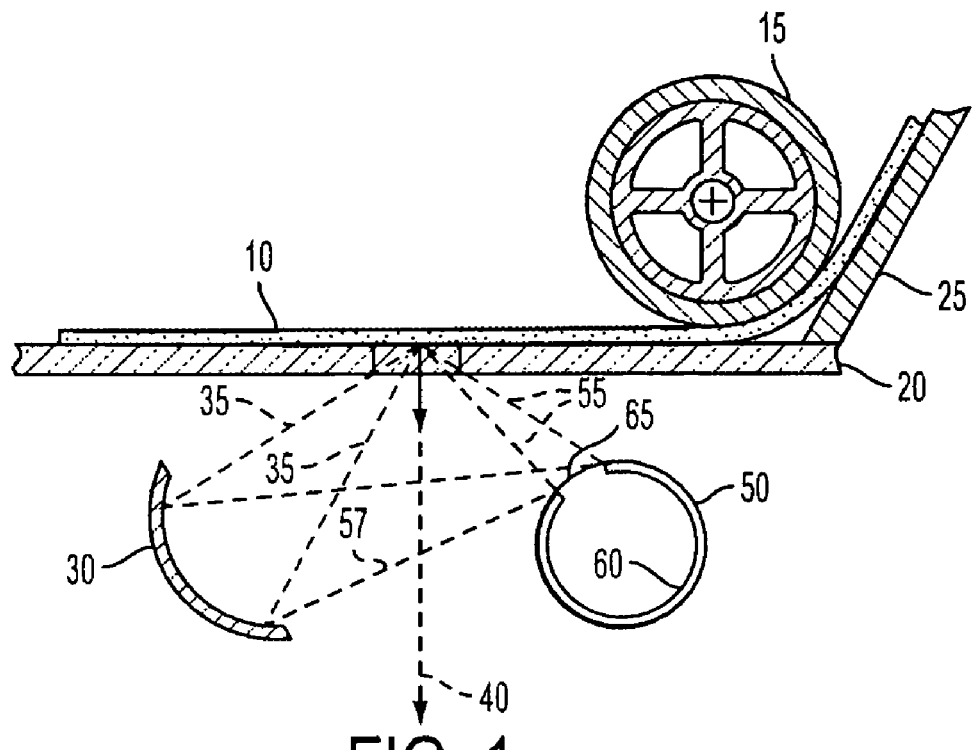
FIG. 1 is a drawing of a document illumination system showing the relationship of a lamp and a reflector with respect to a document guided on to a constant transport velocity imager.
Figure 2:
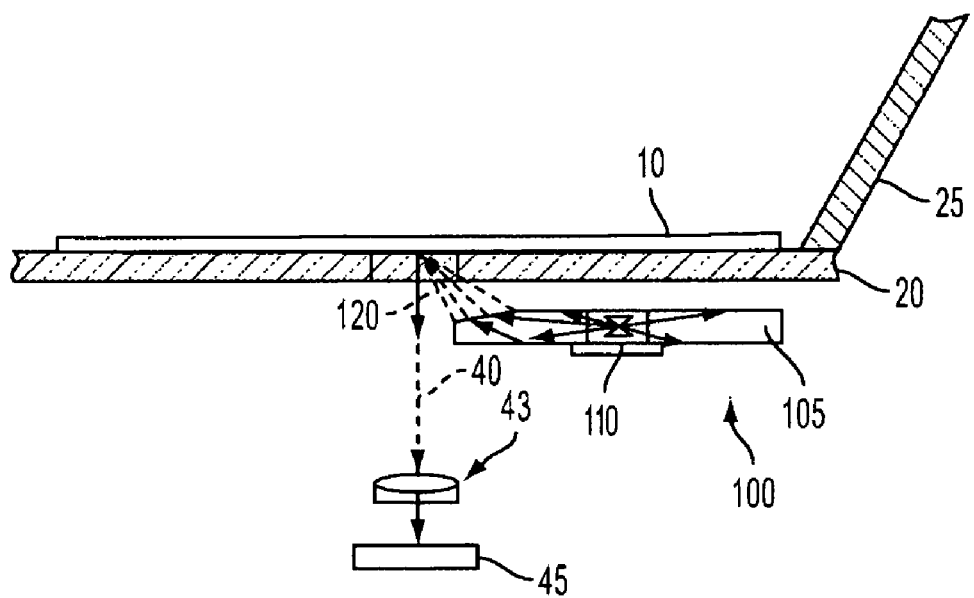
FIG. 2 is a drawing of a document illumination system showing the replacement of the lamp and reflector of a commonly used system with a light-transmissive element fitted with a side emitting LED therein.

In addition to the consistent focal distance provided by the constant velocity transport roller, a well-defined and constant distance needs to be attained between a document illuminator and the document being illuminated for consistent imaging by the scanner imaging unit. In known systems such as shown in FIGS. 1 and 2, the light source under the platen must be adjusted accordingly. The thickness of the platen glass must also be taken into consideration for good quality imaging. In a constant velocity transport integrated platen disclosed herein, any variation due to the placement of the light source is eliminated as the light source is integrated within the platen itself.

Figure 4A:
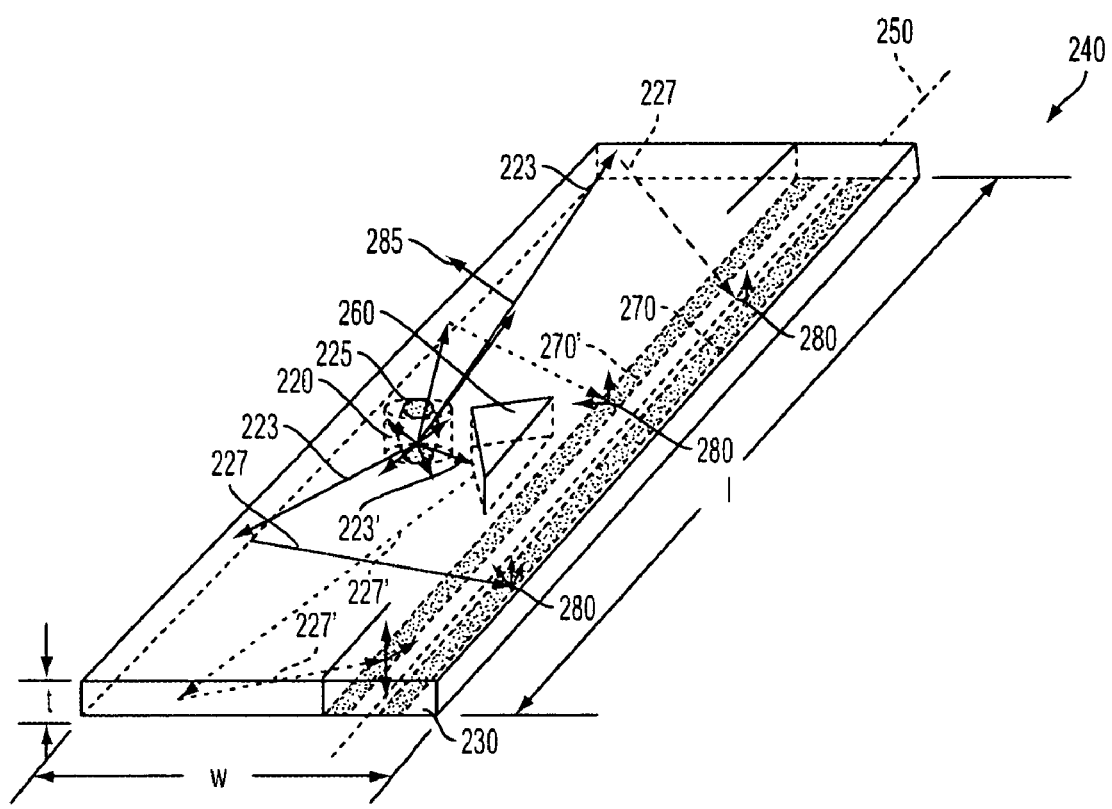
FIG. 4a is a drawing of an embodiment showing the components of a constant velocity transport integrated illuminator, including a light-transmissive platen, a light source, a light deflector, a pair of light extraction surfaces and an aperture where a constant velocity transport transported document is illuminated for imaging.

In one embodiment, platen 240 shown in FIG. 4a is configured to function as a light transmissive element, or a light guide to provide uniform illumination of the document on the surface of the platen. This is accomplished by providing a light source 225 within the platen and an aperture 230 at which the document can be illuminated with high luminescence power and uniformity. The light-transmissive element may have a refractive index ($\eta_{LTE}$) from about 1.4 to about 1.7. The light-transmissive element can be glass, which offers durability, or acrylic, which can be easily molded and machined.

Light from light source 225 is injected into the light-transmissive element platen through a cavity 220 formed in platen 240. The cavity may be a circular opening having a diameter d, for example, but not limited to, from about 5 mm to about 7 mm to accommodate a side emitting LED such as manufactured by Lumileds. For strength and other mechanical considerations, the dimensions of the cavity may be governed by other factors such as the thickness of the platen material, the length and width of the platen. The cavity may be formed from about 4 mm to about 15 mm from the proximal edge of the light-transmissive element platen. For the cavity dimensions cited above, the length (l) can be from about 300 mm to about 350 mm, the width (w) from about 15 mm to about 30 mm and the thickness (t) from about 4 mm to about 10 mm.

Light rays emanating from light source 225 may emanate in equal strength in all directions. Some of the immediate rays, such as those shown in solid lines and referenced by numeral 223 leaving cavity 220 travel to and reflect from various parts of the light-transmissive element platen light guide as shown in dashed lines referenced by numeral 227. It is possible to arrange the optical geometry of the platen such that most of the rays 227 go through total internal reflection and arrive at radiation extraction surfaces 270 and 270' in a manner that the light is reflected diffusively in the direction of aperture 230 (better seen in FIG. 7) directly above the strips of extraction surfaces shown in FIG. 4a. (The nature and characteristics of extraction surfaces and total internal reflection are generally well-known. Total internal reflection in document illuminators is described in application Ser. No. 10/995,462. For efficient extraction of light, surfaces such as, but not limited to trapezoidal or dot patterns may be used). Light coupled into the platen from source 225 is scattered by extraction surfaces which are located on the bottom side of the platen, parallel to and on either side of the object line 250 along the axis of aperture 230. The extraction surfaces serve to frustrate total internal reflection and scatter the incident light, thus providing diffused, dual sided illumination at the document plane. The extraction surfaces are separated laterally to allow for imaging through aperture 230 and they may be formed on the sidewall adjacent the aperture of the platen in addition to the bottom surface of the platen.

Figure 7:
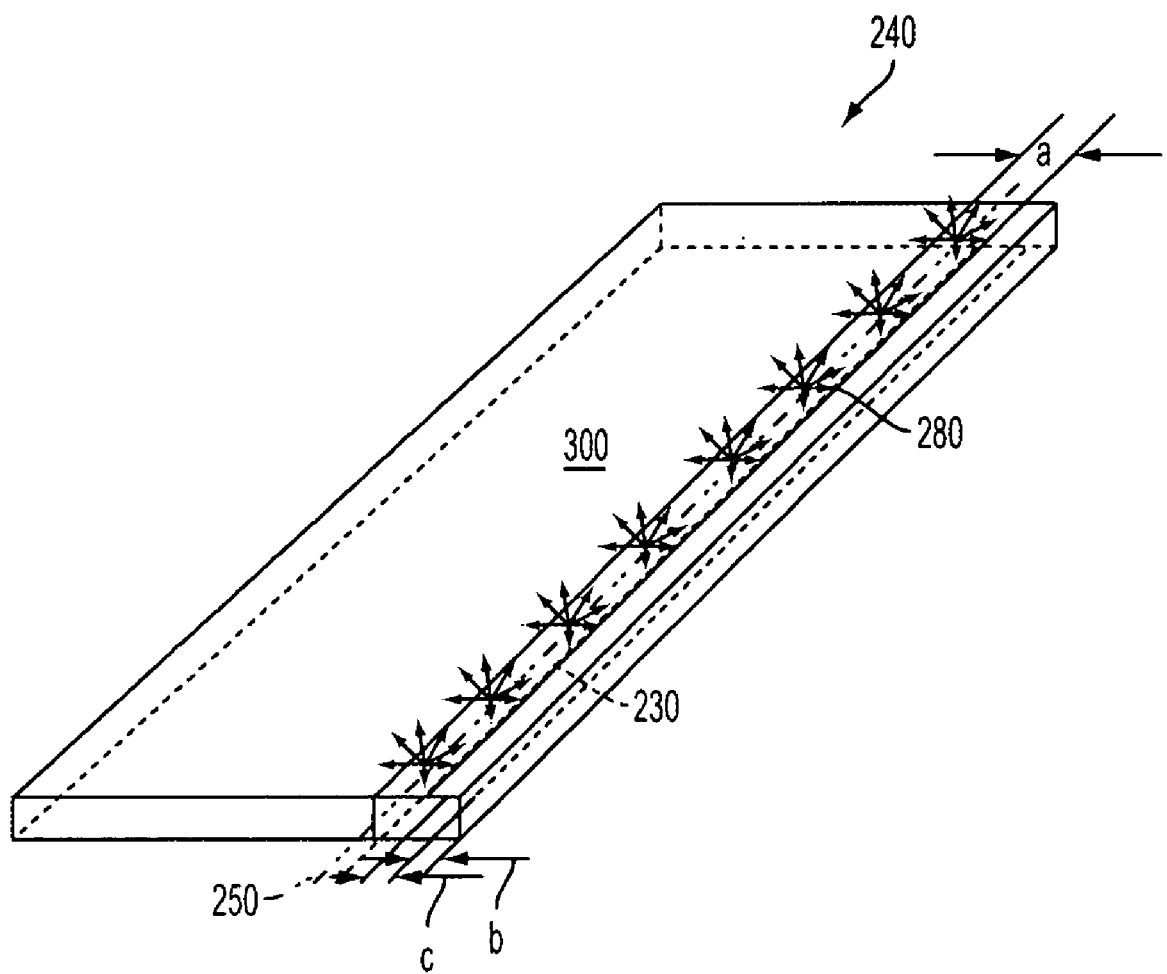
FIG. 7 is a drawing of an embodiment showing the encasement of the constant velocity transport integrated illuminator by a surround to enhance the strength and uniformity of the illumination profile at the aperture for improved and compact imaging.

Now turning to FIG. 7, aperture 230 is shown in closer detail. The aperture 230 is formed along the length (l) of the top edge of the platen with a width a shown in FIG. 7 which may be, for example, from about 2 mm to about 10 mm. The strips of extraction surfaces have a width b which may be, for example, from about 0.1 mm to about 7 mm, and they are separated laterally by distance c which may be, for example, from about 2 mm to about 10 mm. It will be understood that the aperture may be formed other than at the top surface of the light-transmissive element platen. For example, the aperture may be formed by chamfering the top edge of the platen so that the aperture encompasses the top surface as well as the side wall adjacent to top edge.

Turning back to FIG. 4a, it will be noted from the position of cavity 220 in platen 240 in FIG. 4a that at its closest point to the extraction surfaces 270 beneath the aperture 230, the illumination profile corresponding substantially to that closest point will develop an uneven bright "hot" spot. An aspect of the disclosed embodiment provides a light deflector 260. An immediate light ray 223' leaving the light source 225 is reflected off 260 by means of TIR resulting in dashed ray 227' which in turn is reflected from the side wall as 227" to ultimately be extracted at surface 270 and finally transmitted out from aperture 230 as luminescence to illuminate a document (not shown).

The light deflector 260 is formed by molding or machining a prismatic opening into the light-transmissive element. In general, the feature will be an opening the contour of which may resemble a triangle. To improve TIR efficiency, the vertex of the "triangle" nearest the source cavity may be cusp shaped. The deflector may extend through the entire thickness of the platen although this is not a requirement.

Figure 5:
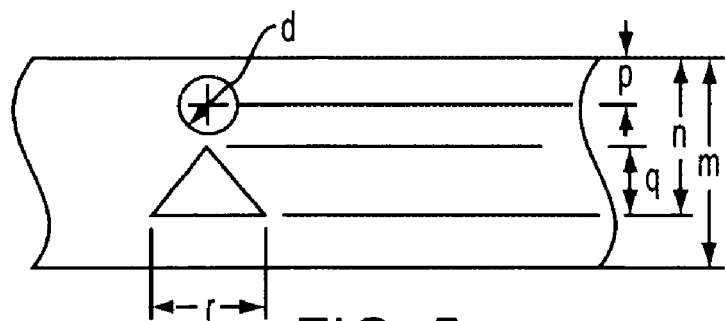
FIG. 5 is a drawing showing the dimensional relationships between the light cavity and the light deflector of the constant velocity transport integrated illuminator.
Figure 6A:
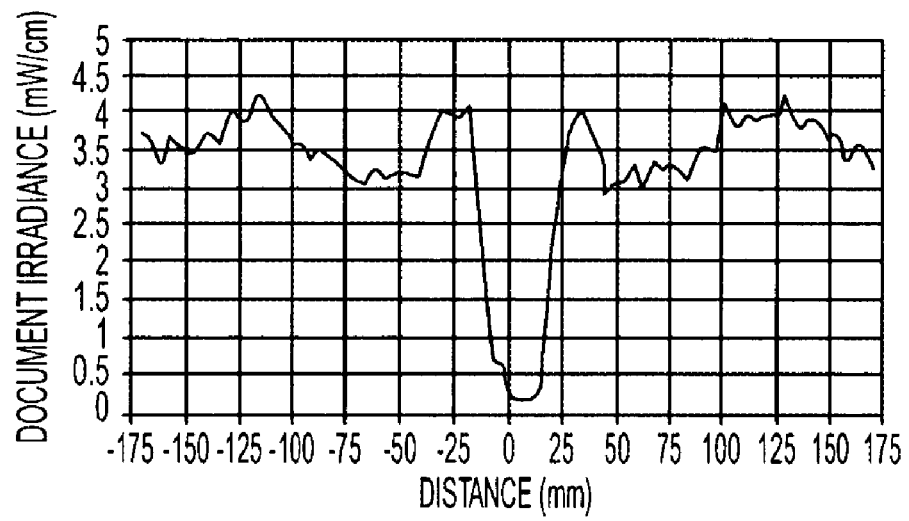
FIG. 6a is a graphical drawing showing the axial illumination profile at the object line of the constant velocity transport integrated illuminator.
Figure 6B:
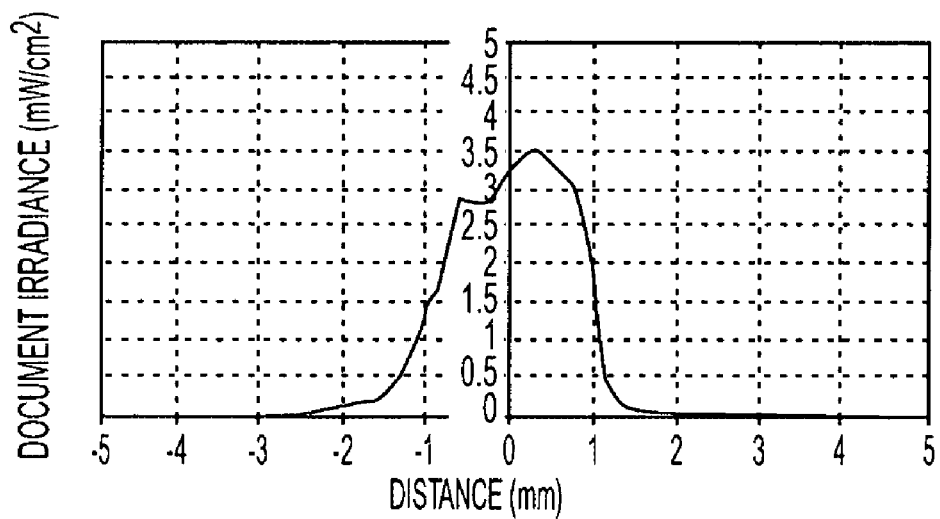
FIG. 6b is a graphical drawing showing the transverse illumination profile 0.1 mm above the surface of the surround encasing the constant velocity transport integrated illuminator.

The effect of the light deflector 260 of FIG. 4a can be understood through simulation of a computer model. Graphical results for an exemplar light-transmissive element platen of dimensions of about 340 mm×20×4 (l×w×t) and d=6 mm, m=20 mm, n=13 mm, p=4 mm, and q=5 mm, and r=12 mm of FIG. 5 are set forth in FIGS. 6a and 6b. FIG. 6a illustrates the axial document illumination profile for a 5 watt light emitting diode along object line axis 250 in FIG. 4a while FIG. 6b depicts the transverse profile normal to the object line axis 250. The graphs show that for a single 5-watt LED, irradiance values on the order of 4 mW/cm$^2$ are attainable with reasonable uniformity. The dip in the center of the profile in FIG. 6a shows the presence of deflector 260 in the light path. The dip may be modified by forming a deflector 260 with appropriate contours within the light-transmissive element. For example, the faces of the triangular prism may be undulated or an isosceles rather than an equilateral triangle, or any other polygonal shapes may be used to "fine tune" the resulting profile. The dimensions of the deflector may further be used to balance the optical characteristics of a given length of platen. The particular dip shown in FIG. 6a can be smoothened out by rounding off the vertex of the triangular prism closest to the light source 225.

Figure 4B:
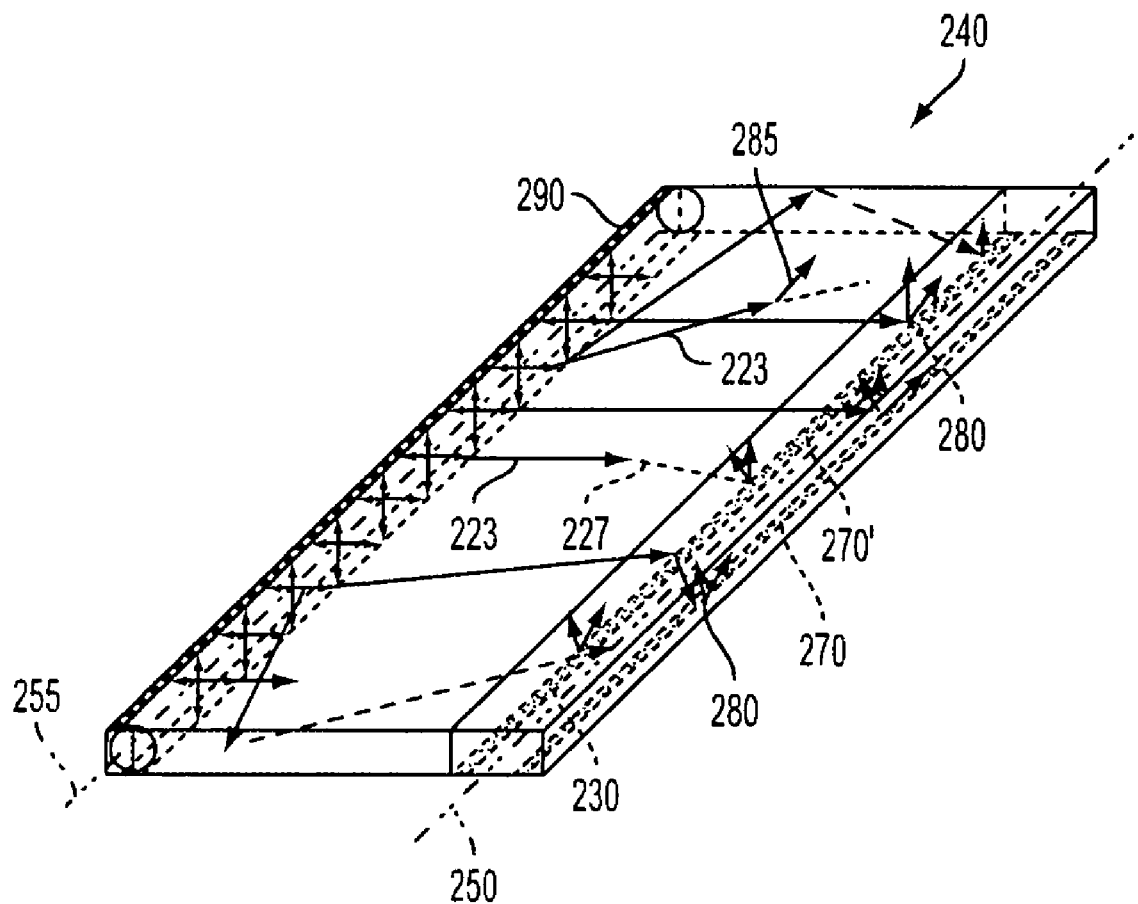
FIG. 4b is a drawing of another embodiment showing the absence of the deflector of FIG. 4a when the side emitted LED is replaced by a linear fluorescent light fitted on the edge opposing the aperture side of the constant velocity transport integrated illuminator.

FIG. 4b shows an embodiment where a linear light source 290, such as a fluorescent, is provided along the edge of the constant velocity transport integrated platen 240 in place of the "point" source of FIG. 4a. The fluorescent light source spans the whole length of the light-transmissive element platen. Consequently, so-called "hot spit" is avoided. Nevertheless, with either a "point" source such as in FIG. 4a, or "line" source such as in FIG. 4b, there are some light rays that do not undergo total internal reflection at the inside faces of the light-transmissive platen. These rays that do not reflect back into the light-transmissive element refract and escape to the surroundings, thus lessening the strength of the luminescence for imaging a document at the aperture. This is schematically depicted by rays 285 in both FIGS. 4a and 4b that refractively escape outwardly from the surface of the platen.

In still another aspect, a surround 300 shown more clearly in FIG. 7 may encase the platen and serve to reflect light back into the light-transmissive element guide that may tend to exit through areas other than the desired illumination region, that is, through the aperture 230. The surround comprises, but not limited to, a white plastic material with a reflectivity ranging from about 80 to about 95%. The thickness may vary from about 0.07 mm to about 1.1 mm. The surround enhances the light power output and improves the illumination profile used to illuminate the document to be imaged.

It will be appreciated that variations of the above-disclosed embodiments and other features and functions, or alternatives thereof, may be desirably combined into many other different devices or applications. Also that various presently unforeseen or unanticipated alternatives, modifications, variations or improvements therein may be subsequently made by those skilled in the art which are also intended to be encompassed by the following claims.

What is claimed is:

1. An imaging device comprising:
   a platen comprising a light-transmissive element having a first edge, an opposing edge, a top surface and a bottom surface;
   a cavity formed in said light-transmissive element proximal to said first edge;
   a light source positioned in said cavity proximal to said first edge of the light-transmissive element;
   an aperture formed on said top surface of said light-transmissive element proximal to said opposing edge of said light-transmissive element;
   a light deflector disposed between said light source and said aperture;
   one or more extraction surfaces formed on said bottom surface of said platen opposing said aperture on said top surface of said light-transmissive element configured to scatter light; and
   a surround encasing said light-transmissive element around said aperture.

2. The imaging device in accordance with claim 1, wherein the device is configured to cause constant velocity transport across the platen.

3. The imaging device in accordance with claim 1, wherein said light-transmissive element of said platen has a refractive index ($\eta_{LTE}$) from about 1.4 to about 1.7.

4. The imaging device in accordance with claim 1, wherein said cavity of said platen has a circular cross-section.

5. The imaging device in accordance with claim 1, wherein said cavity of said platen has a polygonal cross-section.

6. The imaging device in accordance with claim 1, wherein said light source positioned in the platen comprises a side emitting light emitting diode.

7. The imaging device in accordance with claim 1, wherein said light source positioned in the platen comprises a fluorescent light.

8. The imaging device in accordance with claim 1, wherein said light-transmissive element of said platen is configured to provide total internal reflection of light rays.

9. The imaging device in accordance with claim 8, wherein said extraction surfaces of said platen frustrate said total internal reflection of light rays and directs light towards said aperture.

10. The imaging device in accordance with claim 1, wherein said light deflector of said platen deflects light emitted from the light source away from said aperture.

11. The imaging device in accordance with claim 1, wherein said extraction surfaces of said platen comprise two surfaces laterally separated from each other.

12. The imaging device in accordance with claim 1, wherein said extraction surfaces of said platen comprise dot pattern and trapezoidal features.

13. An imaging device in accordance with claim 1, wherein said surround encasing the light-transmissive element around said aperture comprises a plastic reflective material.

14. The imaging device in accordance with claim 1, wherein said imaging device comprises a constant velocity transport system.

15. The imaging device comprising:
   a light-transmissive platen having an embedded light source, one or more extraction surfaces configured to scatter light, an aperture, a light deflector disposed between said light source and said aperture, and a surround configured with respect to one another to cause light from said light source to be reflected through said aperture to an image placed on the platen and to obtain reflected light from said image; and
   one or more light-sensitive sensors configured with respect to said platen to sense said reflected light from said image.

16. The imaging device in accordance with claim 15, wherein said light-transmissive platen has a length from about 300 mm to about 350 mm.

17. The imaging device in accordance with claim 15, wherein said light-transmissive platen has a thickness from about 4 mm to about 10 mm, and a width ranging from about 15 mm to about 30 mm.

18. The imaging device in accordance with claim 15, wherein the imaging device further comprises a constant velocity image transporter operatively configured to transport an image across said light-transmissive platen.

19. The imaging device in accordance with claim 15, wherein said sensors comprise charge coupled devices.

20. The imaging device in accordance with claim 15, wherein said sensors comprise a full width array sensor.

* * * * *